US012186606B2

(12) United States Patent
Koushik et al.

(10) Patent No.: US 12,186,606 B2
(45) Date of Patent: Jan. 7, 2025

(54) LOW NOISE DISCHARGE NOZZLE

(71) Applicant: KIDDE-FENWAL, INC., Ashland, MA (US)

(72) Inventors: Sudarshan N. Koushik, West Hartford, CT (US); Duane C. McCormick, Colchester, CT (US)

(73) Assignee: KIDDE-FENWAL, LLC, Ashland, MA (US)

( * ) Notice: Subject to any disclaimer, the term of this patent is extended or adjusted under 35 U.S.C. 154(b) by 0 days.

(21) Appl. No.: 16/972,847

(22) PCT Filed: Jan. 31, 2020

(86) PCT No.: PCT/US2020/016166
§ 371 (c)(1),
(2) Date: Dec. 7, 2020

(87) PCT Pub. No.: WO2021/154287
PCT Pub. Date: Aug. 5, 2021

(65) Prior Publication Data

US 2022/0355143 A1 Nov. 10, 2022

(51) Int. Cl.
*A62C 31/05* (2006.01)
*A62C 99/00* (2010.01)

(52) U.S. Cl.
CPC .......... *A62C 31/05* (2013.01); *A62C 99/0018* (2013.01)

(58) Field of Classification Search
CPC ....... A62C 31/05; A62C 99/0018; F01N 2/10; F01N 1/082
See application file for complete search history.

(56) References Cited

U.S. PATENT DOCUMENTS 2,886,121 A * 5/1959 Welbourn ................. B64F 1/26 96/381
3,208,551 A * 9/1965 Carls ................... F04B 39/0055 181/226

(Continued)

FOREIGN PATENT DOCUMENTS

CN 202733311 U 2/2013
EP 1837488 A1 9/2007

(Continued)

OTHER PUBLICATIONS

International Search Report of the International Searching Authority; International Application No. PCT/US2020/016166; International Filing Date: Jan. 31, 2020; Date of Mailing: Oct. 7, 2020; 24 pages.

(Continued)

*Primary Examiner* — Joseph A Greenlund
(74) *Attorney, Agent, or Firm* — Honigman LLP

(57) ABSTRACT

A nozzle assembly for a fire suppression system includes a body having an inlet end for receiving a flow of fire extinguishing agent from the fire suppression system at an inlet pressure and a nozzle portion extending from the body. The nozzle portion includes an interior cavity having an outlet end, a center body arranged within the interior cavity adjacent the outlet end, and a plurality of exit orifices formed in an outer wall of the nozzle portion, in communication with the interior cavity, for vectoring the flow of fire extinguishing agent exiting therefrom and to reduce a noise level of the nozzle assembly. At least one perforated filter member is positioned upstream from the plurality of exit orifices formed in the nozzle portion, for reducing the inlet pressure of the flow of fire extinguishing agent.

17 Claims, 11 Drawing Sheets

(56) References Cited

U.S. PATENT DOCUMENTS

| | | | | | |
|---|---|---|---|---|---|
| 3,380,553 | A * | 4/1968 | Gibel | F01N 13/16 181/269 |
| 3,561,561 | A * | 2/1971 | Trainor | F01N 1/08 181/267 |
| 3,898,063 | A * | 8/1975 | Gazan | F01N 1/081 181/231 |
| 3,949,828 | A * | 4/1976 | Frochaux | G10K 11/161 181/256 |
| 4,134,472 | A * | 1/1979 | Trainor | B01D 46/2411 181/243 |
| 4,316,523 | A * | 2/1982 | Boretti | F01N 13/1855 181/258 |
| 4,749,058 | A * | 6/1988 | Trainor | F15B 21/008 181/239 |
| 5,767,459 | A * | 6/1998 | Sell | F01N 1/082 181/258 |
| 5,962,821 | A * | 10/1999 | Iannetti | F01N 1/18 181/258 |
| 6,109,387 | A * | 8/2000 | Boretti | F01N 1/082 181/258 |
| 9,404,365 | B2 * | 8/2016 | Taylor | F01B 31/16 |
| 9,457,214 | B2 * | 10/2016 | Goto | A62C 99/0018 |
| 9,597,537 | B2 * | 3/2017 | Inoue | A62C 31/02 |
| 10,507,343 | B2 * | 12/2019 | Agan | A62C 99/0018 |
| 11,324,979 | B2 * | 5/2022 | Inoue | A62C 13/64 |
| 11,369,978 | B2 * | 6/2022 | Inoue | A62C 31/05 |
| 11,389,678 | B2 * | 7/2022 | Agan | A62C 31/05 |
| 2009/0266643 | A1 * | 10/2009 | Fukano | F04B 39/0033 181/258 |
| 2012/0205128 | A1 * | 8/2012 | Goto | A62C 99/0018 169/11 |
| 2013/0292140 | A1 * | 11/2013 | Inoue | A62C 31/02 169/11 |
| 2018/0272166 | A1 * | 9/2018 | Ahmadzadegan | F15B 21/008 |
| 2018/0272167 | A1 * | 9/2018 | Ahmadzadegan | A62C 31/05 |
| 2020/0139174 | A1 * | 5/2020 | Inoue | A62C 31/03 |
| 2022/0355143 | A1 * | 11/2022 | Koushik | A62C 31/05 |

FOREIGN PATENT DOCUMENTS

| | | | |
|---|---|---|---|
| EP | 3195905 | A1 | 7/2017 |
| EP | 3639899 | A1 | 4/2020 |
| FR | 2812206 | A1 | 2/2002 |
| GB | 1432048 | A | 4/1976 |
| JP | 2019129883 | A | 8/2019 |
| WO | 2017096249 | A1 | 6/2017 |

OTHER PUBLICATIONS

Written Opinion of the International Searching Authority; International Application No. PCT/US2020/016166; International Filing Date: Jan. 31, 2020; Date of Mailing: Oct. 7, 2020; 12 pages.

* cited by examiner

LOW NOISE DISCHARGE NOZZLE

CROSS REFERENCE TO RELATED APPLICATIONS

This application is a National Stage Application of PCT/US2020/016166, filed Jan. 31, 2020, which is incorporated by reference in its entirety herein.

BACKGROUND

The subject invention is directed to fire suppression systems, and more particularly, to a low noise nozzle assembly for use with a fire suppression system deployed in a data center.

Data centers are relied upon to store and distribute valuable information across many industries. Industry demands that these data centers remain continuously functional. Downtime can damage the reputation of a data center and result in the loss of customers. The valuable information handled by data centers is primarily stored on magnetic Hard Disk Drives (HDDs). These hardware devices have a known sensitivity to sound. That is, sound pressure can cause vibration induced damage or disruptions to an HDD.

Unfortunately, inert gas fire suppression systems typically used to protect the server rooms that house this type of equipment in a data center, utilize nozzles that can produce sound levels which may have an adverse effect on this noise sensitive hardware. Indeed, some common nozzles generate noise levels in excess of 130 dB, which creates an unacceptable risk of lost data and operation time for a data center.

It would therefore be beneficial to provide a nozzle for a fire suppression system that produces lower noise levels than more common nozzles, so that the nozzle can be readily used to protect data centers without risk of lost operation time.

BRIEF DESCRIPTION

According to one embodiment, a nozzle assembly for a fire suppression system includes a body having an inlet end for receiving a flow of tire extinguishing agent from the fire suppression system at an inlet pressure and a nozzle portion extending from the body. The nozzle portion includes an interior cavity having an outlet end, a center body arranged within the interior cavity adjacent the outlet end, and a plurality of exit orifices formed in an outer wall of the nozzle portion, in communication with the interior cavity, for vectoring the flow of fire extinguishing agent exiting therefrom and to reduce a noise level of the nozzle assembly. At least one perforated filter member is positioned upstream from the plurality of exit orifices formed in the nozzle portion, for reducing the inlet pressure of the flow of fire extinguishing agent.

In addition to one or more of the features described above, or as an alternative, in further embodiments an internal cross-sectional area of the interior cavity taken at any location along a central axis X-X of the nozzle portion is equal to a total open area of the plurality of exit orifices arranged downstream from that location.

In addition to one or more of the features described above, or as an alternative, in further embodiments the nozzle portion is generally cylindrical in shape.

In addition to one or more of the features described above, or as an alternative, in further embodiments a cross-sectional area of the center body varies over a length of the center body, the length being oriented parallel to a longitudinal axis of the nozzle assembly.

In addition to one or more of the features described above, or as an alternative, in further embodiments the center body has an upstream end and a downstream end, and a diameter of the center body at the upstream end is smaller than a diameter of the center body at the downstream end such that the center body is generally conical in shape.

In addition to one or more of the features described above, or as an alternative, in further embodiments the center body has a hollow interior.

In addition to one or more of the features described above, or as an alternative, in further embodiments the hollow interior of the center body is filled with a sound absorbing material.

In addition to one or more of the features described above, or as art alternative, in further embodiments one or more apertures are formed in a surface of the center body.

In addition to one or more of the features described above, or as an alternative, in further embodiments the center body is formed from a sheet metal.

In addition to one or more of the features described above, or as an alternative, in further embodiments the center body is formed from a mesh material.

In addition to one or more of the features described above, or as an alternative, in further embodiments the at least one perforated filter member is formed from a perforated metal plate.

In addition to one or more of the features described above, or as an alternative, in further embodiments the at least one perforated filter member has about between 20% to 40% open area as defined by a multiplicity of perforations.

In addition to one or more of the features described above, or as an alternative, in further embodiments the at least one perforated filter member includes a plurality of perforated filter members positioned within the interior cavity of the nozzle portion in spaced apart relationship along a central axis thereof.

In addition to one or more of the features described above, or as an alternative, in further embodiments each of the plurality of perforated filter members has the same porosity.

In addition to one or more of the features described above, or as an alternative, in further embodiments each of the plurality of perforated filter members has a different porosity.

In addition to one or more of the features described above, or as an alternative, in further embodiments a porous metal foam insert is positioned downstream from the at least one perforated filter member.

In addition to one or more of the features described above, or as an alternative, in further embodiments the inlet end of the body includes a metering orifice.

In addition to one or more of the features described above, or as an alternative, in further embodiments the flow of fire extinguishing agent is output from the plurality of exit orifices having a generally horizontal orientation.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
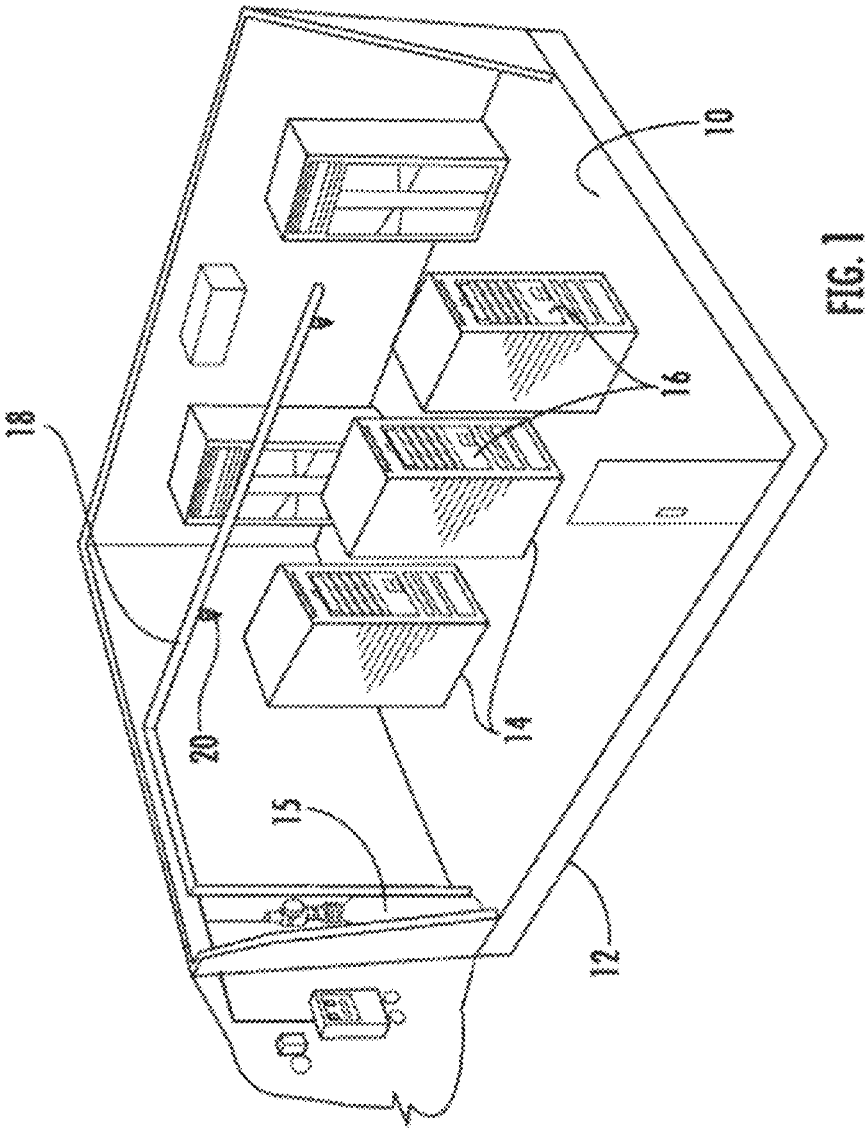
FIG. 1 is a perspective view of a server room in a data center that is protected by a fire suppression system including a low-velocity nozzle according to an embodiment.
Figure 2:
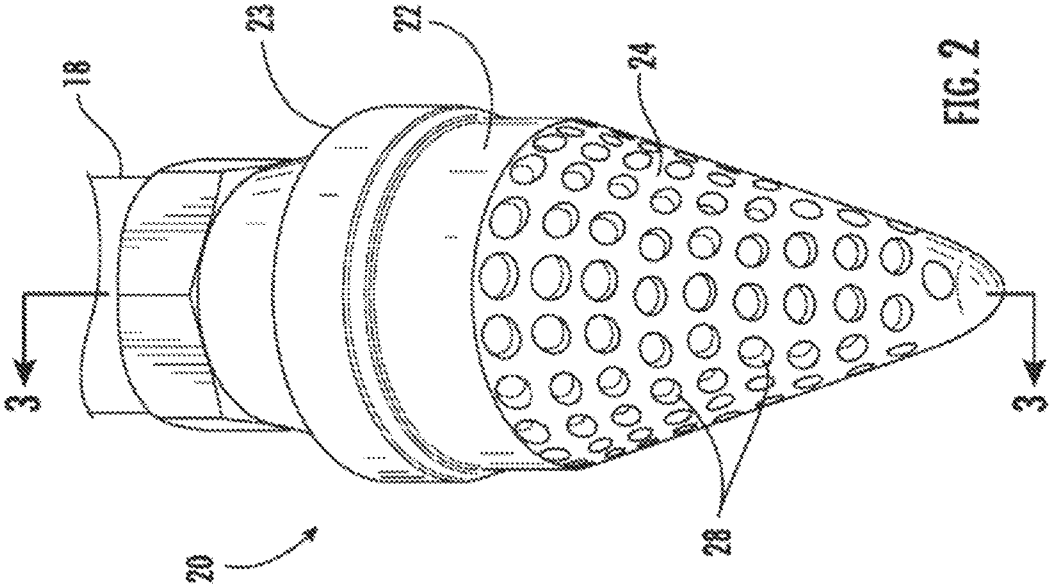
FIG. 2 is a perspective view of a low-velocity nozzle according to an embodiment.

Referring now to the drawings wherein like reference numerals identify similar structural elements and features of the subject invention, there is illustrated in FIG. 1 a server room 10 located in a data center 12, which houses racks 14 containing hard disk drives 16, and a fire suppression system 18 for protecting the server room 10 in the event of the detection of a hazardous condition such as smoke, excessive heat, or fire. The fire suppression system 18 includes a storage tank 15 containing an inert gas fire suppressant, such as argon.

The tire suppression system 18 further includes one or more low-velocity acoustic noise reduction nozzle assemblies constructed in accordance with an embodiment disclosed herein and designated generally by reference numeral 20 for discharging the fire suppressant contained in storage tank 15 into the server room 10 in the event of a fire.

Referring to FIGS. 2-8, various example of the low-velocity acoustic noise reduction nozzle assembly 20 are illustrated. As shown, the nozzle assembly 20 includes a body 22 having an inlet end 23 for receiving a flow of fire extinguishing agent from the fire suppression system 18 at a particular entrance mass flow of about between 0.5 and 1.2 kg/s, such as 0.8 kg/s for example, and inlet pressure of between about 130 psi and 240 psig, such as 200 psig for example. The body 22 of nozzle assembly 20 further includes an axially extending nozzle portion 24.

The axially extending nozzle portion 24 of the nozzle assembly 20 has a outer wall 25 and an interior cavity 26 that defines a central longitudinal axis extending along line X-X in upstream $U_s$ and downstream directions $D_s$. In the illustrated, non-limiting embodiment of FIGS. 2-6, the outer wall 25 of the nozzle portion 24 is generally conical in shape such that the cross-sectional area of the interior cavity 26 of the nozzle portion 24 decreases in the downstream direction. In another embodiment, best shown in FIGS. 7-8, the outer wall 25 of the nozzle portion 24 is generally cylindrical in shape such that the cross-sectional area of the interior cavity 26 defined by the outer wall 25 of the nozzle portion 24 is generally constant over the axial length of the nozzle portion 24.

Figure 3:
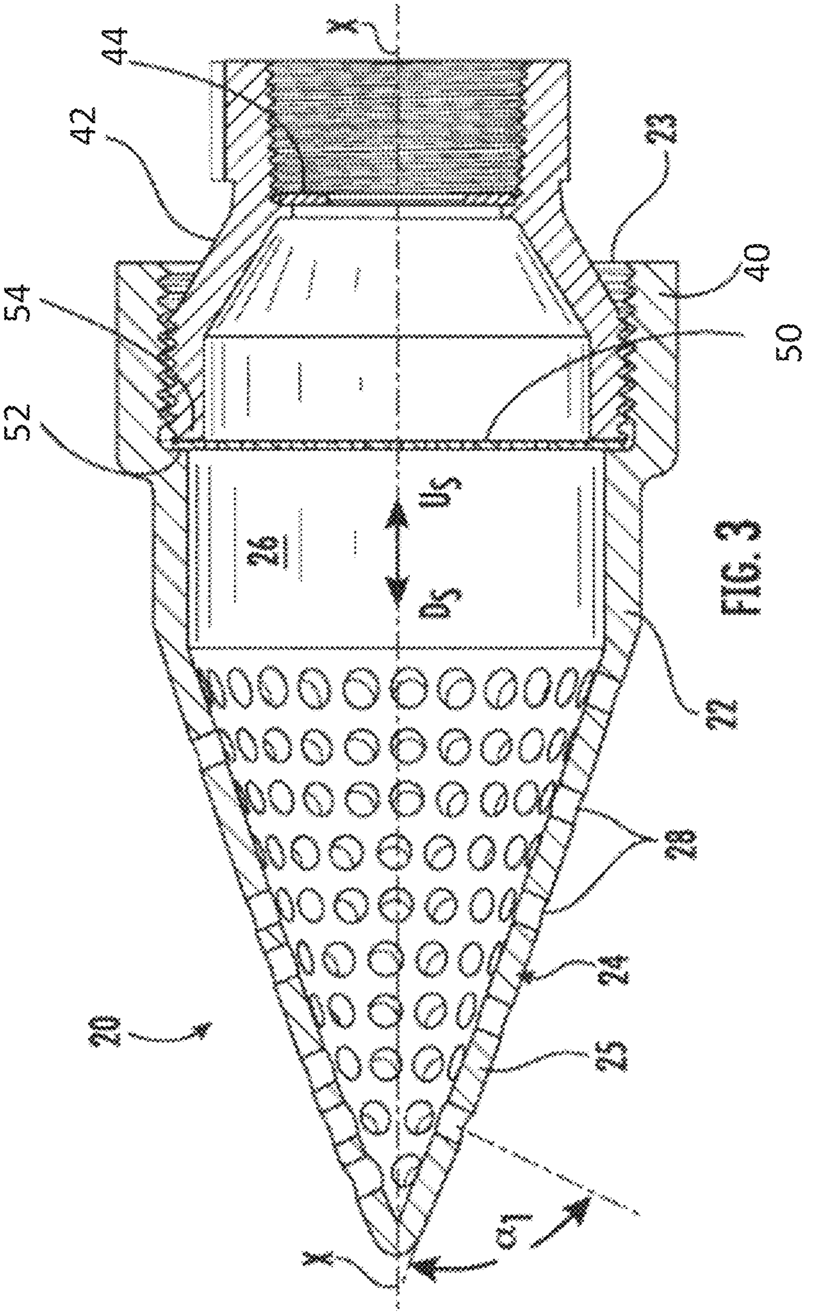
FIG. 3 is a cross-sectional view of the nozzle of FIG. 2 taken along line 3-3 according to an embodiment.
Figure 4:
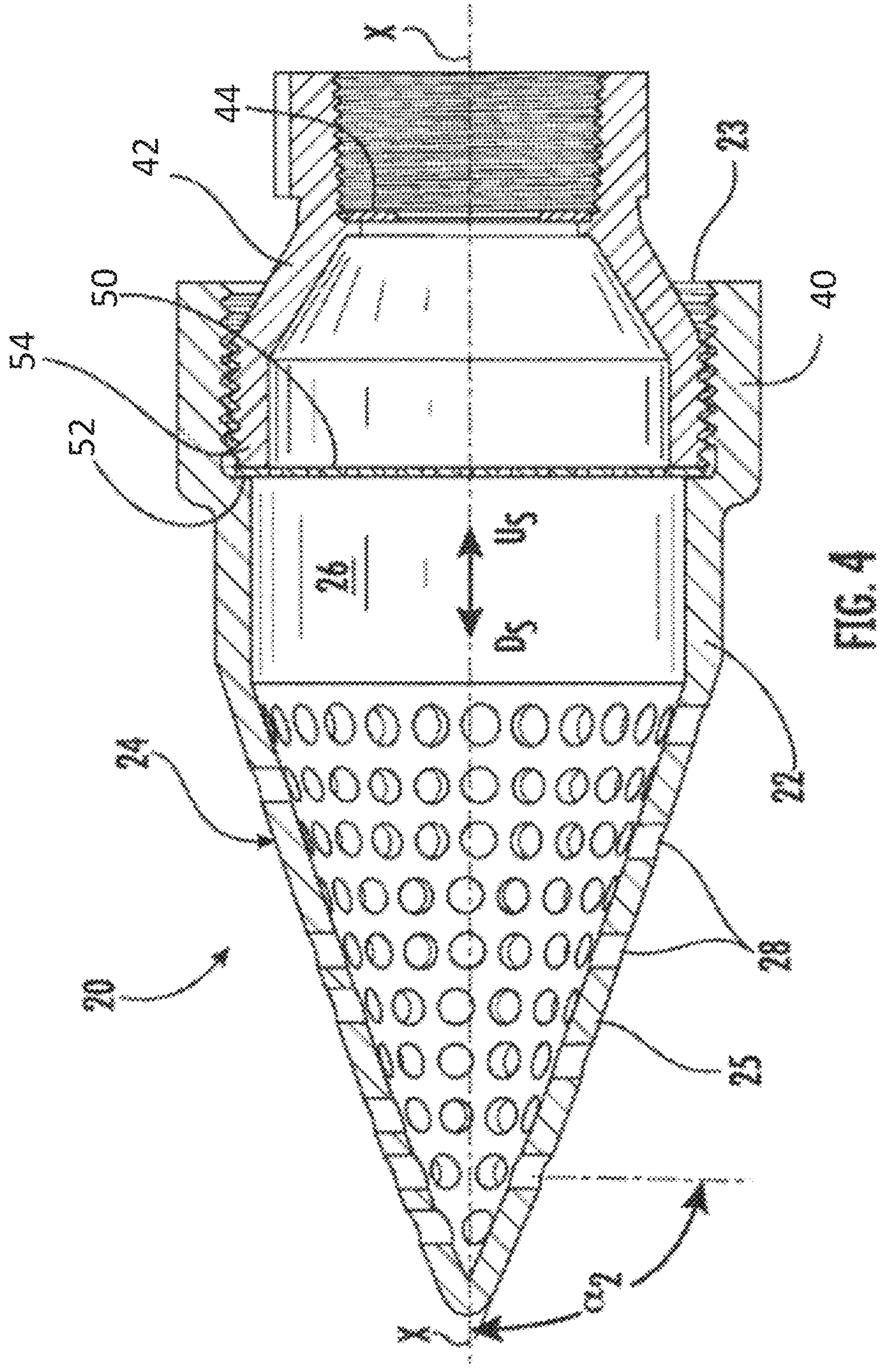
FIG. 4 is a cross-sectional view of another nozzle according to an embodiment.

A plurality of exit orifices 28 are formed in the outer wall 25 of nozzle portion 24 for efficiently vectoring the flow of fire extinguishing agent exiting therefrom and to effectively reduce the acoustic noise level of the nozzle assembly 20. Moreover, the exit orifices 28 formed in the outer wall 25 of nozzle portion 24 help to reduce the overall acoustic signature of the nozzle assembly 20. In an embodiment, such as shown in FIG. 3 for example, the exit orifices 28 defined in the outer wall 25 of the nozzle portion 24 are oriented at an angle $\alpha_1$ that is perpendicular to the local wall angle of the conical outer wall 25 of nozzle portion 24 to control fluid vectoring. Alternatively, as shown in FIG. 4, the exit orifices 28 defined in the outer wall 25 of the nozzle portion 24 may be oriented at an angle $\alpha_2$ that is perpendicular to the central axis X-X of the nozzle portion 24 so as to control fluid vectoring in a different manner. Alternatively, the exit orifices 28 can be oriented at other angles ranging from the orientation shown in FIG. 3 to the orientation shown in FIG. 4, so as to control fluid vectoring in another preferred manner, which would depend upon the configuration of the area to be protected by the nozzle assembly 20. By expelling the fire extinguishing agent from the plurality of exit orifices in a generally horizontal direction, perpendicular to the axis X of the nozzle portion 24, the flow may cover a greater area, thereby providing better coverage within the server room 10.

Figure 5:
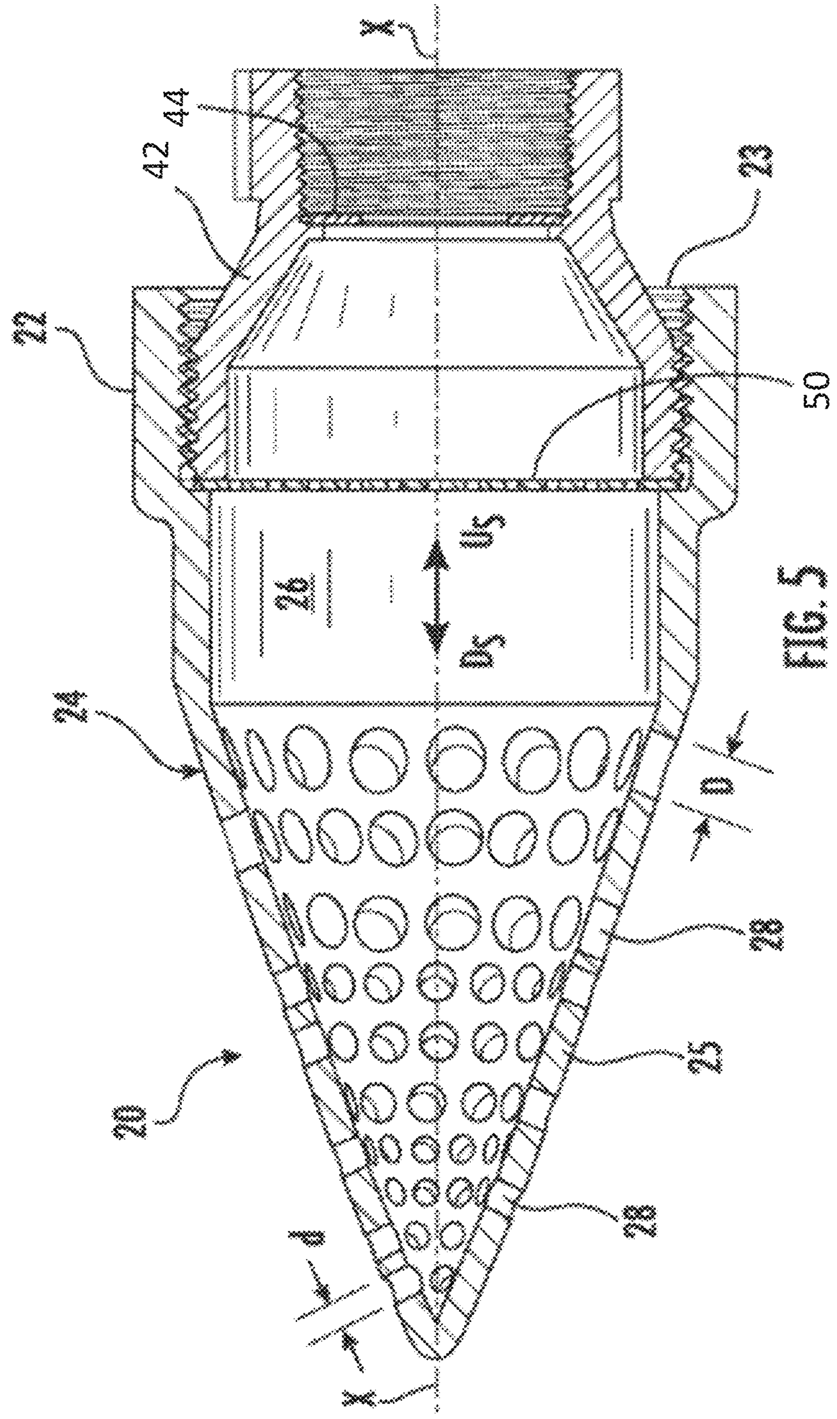
FIG. 5 is a cross-sectional view of another nozzle according to an embodiment.

It is also envisioned that the exit orifices 28 formed in the outer wall 25 of the nozzle portion 24 may vary in diameter and/or in number along the central axis X-X of the nozzle portion 24. For example, the upstream exit orifices 28 can have a diameter "D" while the downstream exit orifices 28 can have a smaller diameter "d" as illustrated in FIG. 5, or alternatively, a larger diameter. Although the variations in configurations of the exit orifices 28 are discussed with respect to the a nozzle portion 24 having a conical outer wall 25, it should be understood that a nozzle portion 24 having a cylindrical outer wall 25 may similarly include any configuration of the exit orifices 28 illustrated and described herein.

Those skilled in the art will readily appreciate that the frequency of the noise generated by the nozzle assembly 20 will increase as the exit orifices 28 decrease in size. Accordingly, the diameter of the exit orifices 28 should be sized so as to minimize the overall acoustic signature of the nozzle assembly 20, while maintaining a preferred coverage volume of about 100 $m^3$.

Furthermore, the nozzle portion 24 is preferably dimensioned to progressively decrease in internal cross-sectional area, and thus the inner diameter is selected to, in combination with the distribution of the plurality of exit orifices 28 to provide uniform discharge velocities. The particular uniform discharge velocities provide desired mass flow and dispersal on the one hand while maintaining acceptable sound levels on the other hand. In an embodiment, the nozzle portion 24 is configured so that the internal cross-sectional area of the nozzle portion 24 taken at any point along the central axis X-X is equal to the total open area of the exit orifices 28 formed in the outer wall 25 of the nozzle portion 24 downstream from that point. Consequently, the static pressure within the interior cavity 26 of the nozzle portion 24 will be maintained at a level that will ensure that fire extinguishing agent is uniformly fed to all of the exit orifices 28 for the entire duration of the discharge, which could range from 60 seconds to 120 seconds.

This reduction in the cross-sectional area of the nozzle portion 24 can be achieved via several different configurations. In embodiments where the outer wall 25 is conical in shape (FIGS. 3-6), the slope of the conical outer wall 25 may be selected to achieve a cross-sectional area that is equal to the total open area of exit orifices 28 located downstream therefrom as described above. However, in embodiments where the outer wall 25 is not conical, such as embodiments where the outer wall is cylindrical (FIGS. 8 and 9), a center body 30 may be positioned within the interior cavity 26 of the nozzle portion 24 to achieve the desired change in cross-sectional area over the axial length of the nozzle portion 24. The center body 30 may be formed from any suitable material, and may be substantially solid, or alternatively, may have a generally hollow interior. The center body 30 may be connected to the cylindrical nozzle portion 24 via any suitable connection mechanism. For example, the center body 30 may be integrally formed with the nozzle portion 24, may be welded to the nozzle portion 24, or may be removably affixed thereto, such as via a threaded connection. As shown, the center body 30 is generally conical is shape, with a cross-sectional area of the center body 30 increasing in the downstream direction. In an embodiment, an exterior surface of the center body 30 is generally rounded or smooth to minimize turbulence and noise generated by contact with the flow of fire extinguishing agent.

Further, in embodiments where the center body 30 is generally hollow, an interior of the center body 30 may be filled with a sound absorbing material 32, such as packing foam, fiberglass, or another open celled foam for example. In an embodiment, best shown in FIG. 8, the surface 34 of the center body 30 has a plurality of apertures formed therein. For example the center body 30 may be formed from a mesh material. However, in other embodiments, the center body 30 may be formed from a solid material, such as sheet metal for example, having a plurality of openings or apertures formed therein. In such embodiments, the material selected to form the center body 30 is sufficiently rigid to withstand the forces applied thereto by the flow of fire extinguishing agent through the nozzle portion 24.

With continuing reference to FIG. 3, the inlet end 23 of the body 22 of nozzle assembly 20 includes a threaded flange 40, which is connectable for operative engagement with a threaded fitting 42. The threaded fitting 42 has a conventional NPT format that is adapted to communicate with the fire suppression system 18 and includes a metering orifice 44. In an embodiment, an intermediate portion 43 of the fitting 42 forms a diffuser wherealong the inner diameter (ID) of the fitting 42 diverges (expands in transverse cross-sectional area) from upstream to downstream. The diffuser functions to slow velocity, but typically generates turbulence (discussed below). As is discussed below, the velocity reduction is a step in a dispersal method that produces acceptable sound levels.

The nozzle assembly 20 may additionally include one or more perforated filter members 50 for reducing the entrance velocity of the fire extinguishing agent, in furtherance of acoustic noise level reduction. Moreover, the one or more perforated filter members 50 function to lower the pressure of the incoming flow before entering the nozzle portion 24, dropping the inlet pressure by about 60 psig to a preferred exit pressure to avoid supersonic jet flow. In an embodiment, the preferred exit pressure is about 2 psig. As a result of the one or more perforated filter members 50 advantageously lowering the velocity and pressure of the incoming flow of fire suppressant, in combination with the exit orifices 28 lowering the acoustic signature of the nozzle assembly 20, the nozzle assembly 20 has a resulting noise level equal to or less than about 110 db. Those skilled in the art will readily appreciate that achieving such a noise level will not cause damage or disruption to the HDDs 16 that are located within the server room of a data center 12 in the event of a fire.

In the illustrated, non-limiting embodiment of FIG. 3, a perforated filter member 50 is positioned within the interior cavity 26 of the nozzle portion 24, upstream from the exit orifices 28 formed in the outer wall 25. As shown, the at least one perforated filter member 50 is supported or otherwise firmly retained within the interior cavity 26 of the body 22 of nozzle assembly 20, sandwiched between an interior abutment surface 52 of the body 22 and a leading edge 54 of the threaded fitting 42.

Figure 6:
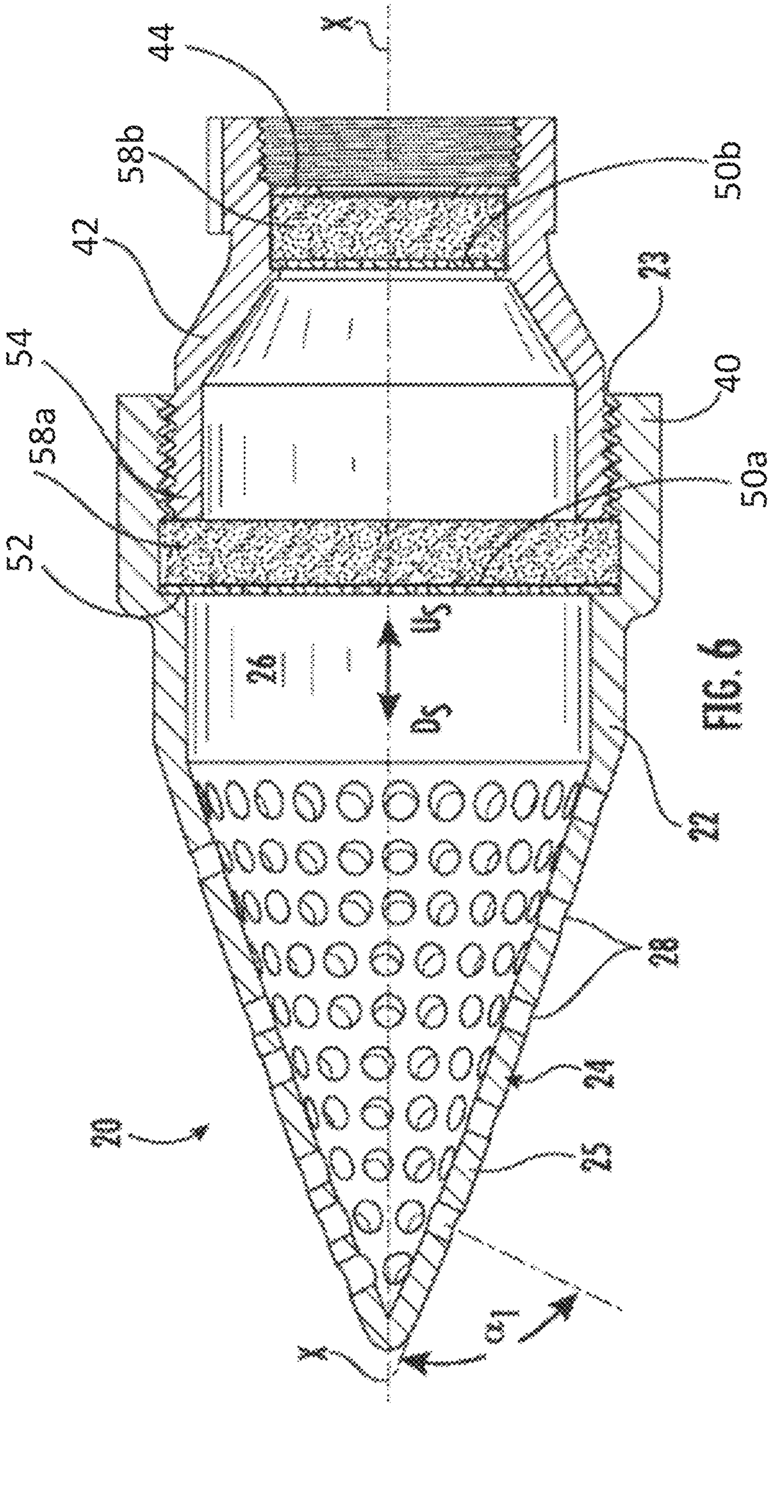
FIG. 6 is a cross-sectional view of yet another nozzle according to an embodiment.
Figure 7:
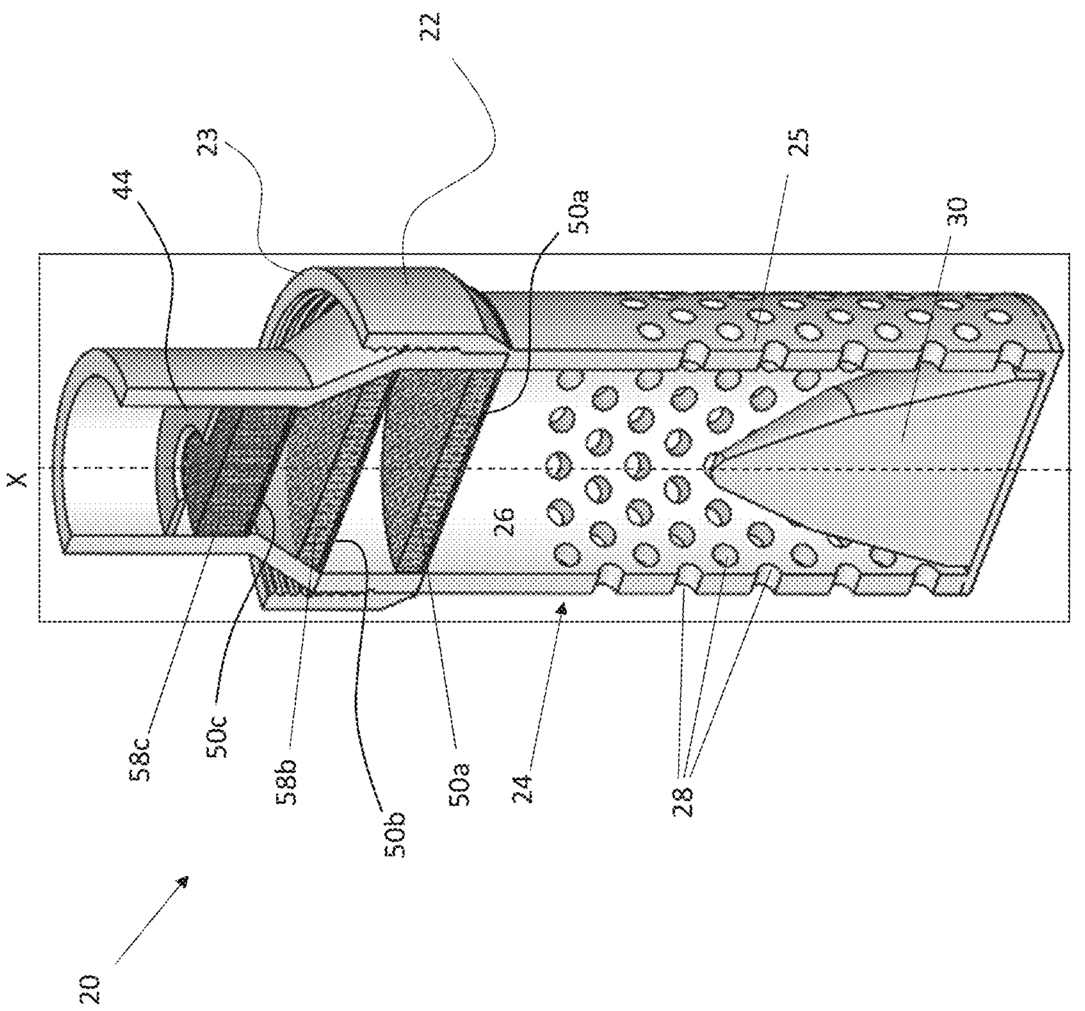
FIG. 7 is a cross-sectional view of a low noise nozzle according to another embodiment.
Figure 8:
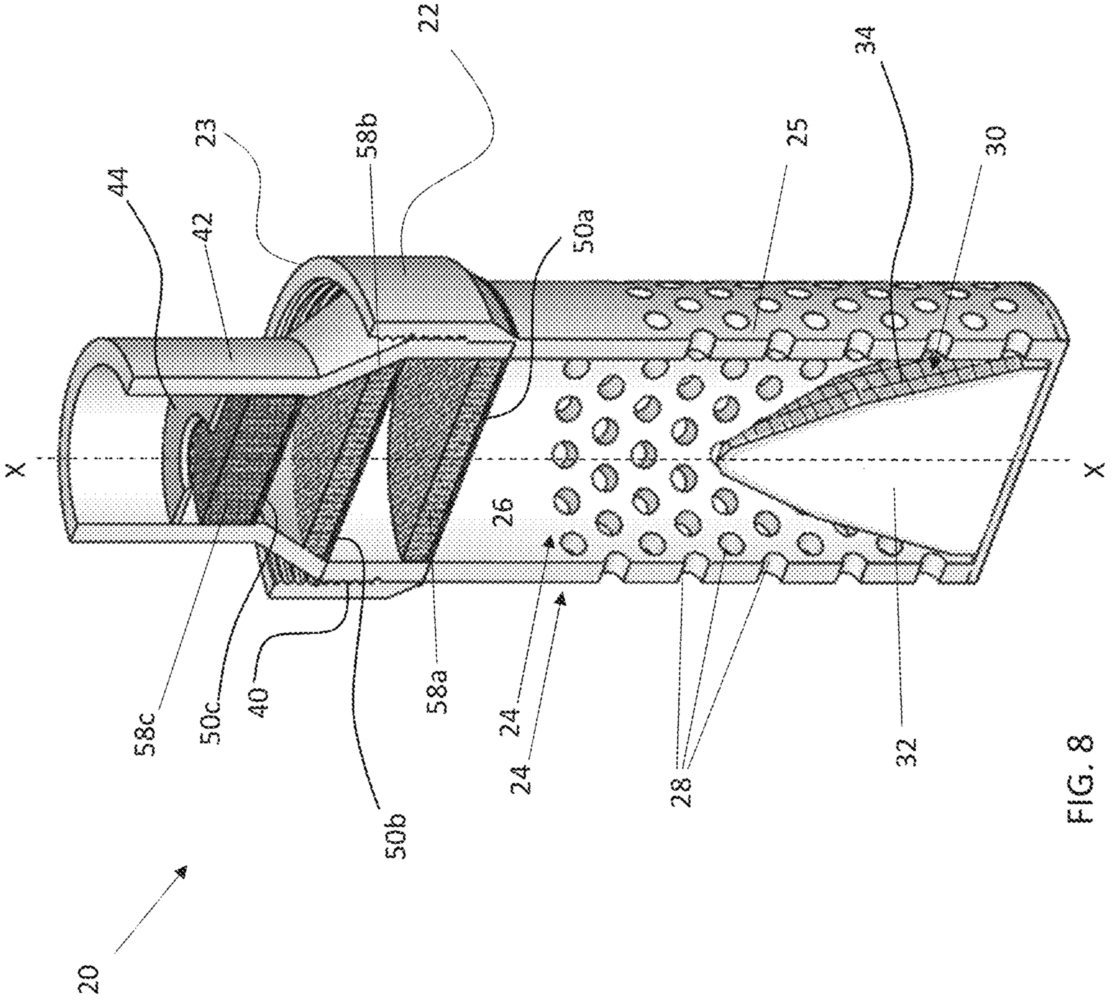
FIG. 8 is a cross-sectional view of a another low noise nozzle according to an embodiment.

While the nozzle assembly 20 is illustrated in FIGS. 3-5 is shown with only one perforated filter member 50 positioned within the interior cavity 26 of nozzle portion 24, it is envisioned that the nozzle assembly 20 could include a plurality of perforated filter members, including two or more than two perforated filter members in spaced apart relationship along the central axis X-X thereof. For example, as best seen in FIG. 6, the nozzle assembly 20 could have two of spaced apart filter members, including a downstream perforated filter member **50*a* positioned within the interior cavity 26 and an upstream perforated filter member Sob positioned within the threaded fitting 42. In yet another embodiment, illustrated in FIG. 7, the nozzle assembly 20 can include three spaced apart filter members 50 including a first perforated filter member 50*a* positioned within the interior cavity 26, a second perforated filter member 50*b* positioned generally centrally within the threaded fitting 42, and a third perforated filter member 50*c*, positioned directly downstream from the metered orifice 44**.

Figure 9:
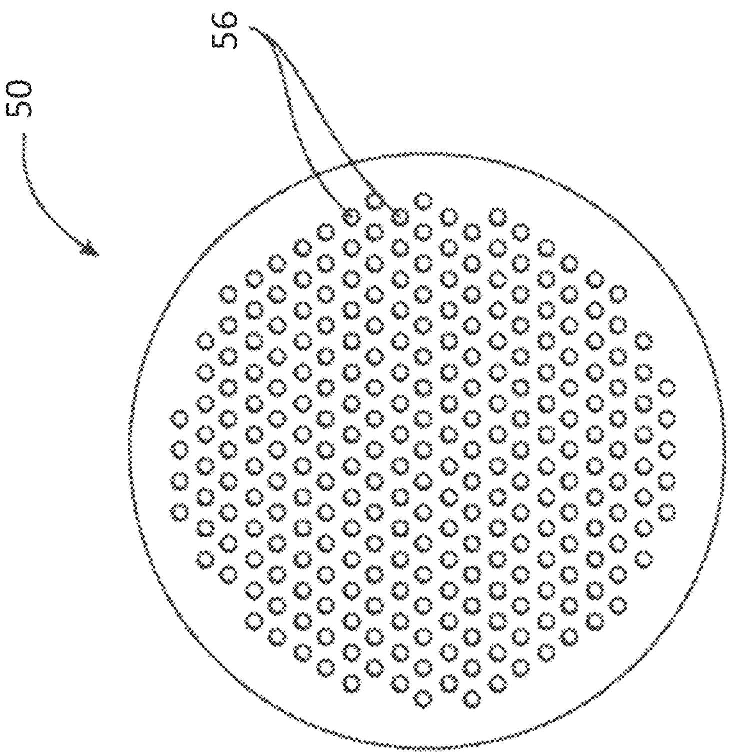
FIG. 9 is a front plan view of a perforated filter member of a nozzle in the form of a perforated metal plate having a multiplicity of perforations according to an embodiment.

An example of a perforated filter member 50 is illustrated in more detail in FIG. 9. As shown, the perforated filter member 50 may be in the form of a perforated metal plate, such as made from aluminum or a similar light-weight metal having a thickness of about 1/16 inch. In an embodiment, about 20% to 40% of the surface area of the perforated filter member 50 is defined by open space. For example, about 23% of the surface of the perforated filter member is open space formed by a multiplicity of apertures 56.

Furthermore, a porous material, such as a metal foam insert for example, could be associated with an upstream side of one or more of the perforated filter members 50 to further reduce the inlet pressure of the fire suppressant. More particularly, in the non-limiting embodiment of FIG. 7, a first porous metal foam insert **58*a* is associated with an upstream side of perforated filter member 50*a*, a second porous metal foam insert 58*b* is associated with an upstream side of perforated filter member 50*b*, and a third porous metal foam insert. 58*c* is associated with an upstream side of perforated filter member 50*c*. When present in the nozzle assembly 20, the porous metal foam inserts may be about 0.5 inches in thickness. When used alone or in combination, these porous components function to reduce the pressure while evenly distributing the flow throughout the cross-sectional area, and reducing the noise associated with the flow turbulence. When the perforated filter member 50/porous metal foam 58 are used just downstream of a metering orifice (44 in FIG. 3), they function to effectively reduce the noise associated with supersonic flow by dissipating the shock formed downstream of the metering orifice 44**.

While each of the perforated filter members 50*a*, 50*b*, and 50*c* may have the same porosity, embodiments where one or more of the filter members 50 has a different porosity is also within the scope of the disclosure. For example, in such an embodiment, the perforated filter members 50*a*, 50*b*, and 50*c* may decrease in porosity in a downstream direction $D_s$ along the axis X-X of the interior cavity 26. Thus, the upstream filter member 50*c* could be a perforated metal plate having a porosity of about 40% and the downstream filter member 50*a* could be a perforated metal plate having a porosity of about 30%, so as to gradually or otherwise progressively reduce the fluid pressure of the fire suppression agent in a stepwise or multi-staged manner.

Figure 10:
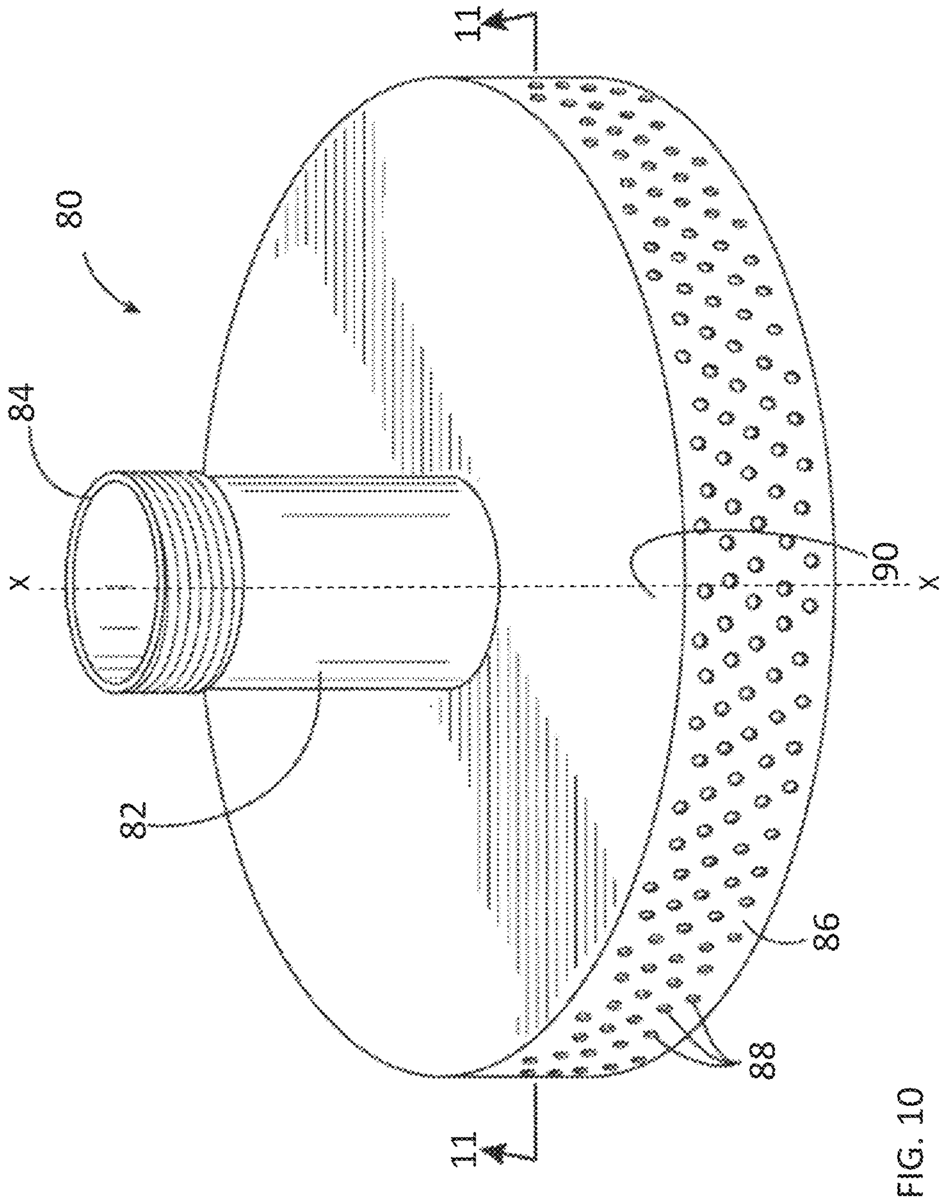
FIG. 10 is a perspective view of another low noise nozzle according to an embodiment.
Figure 11:
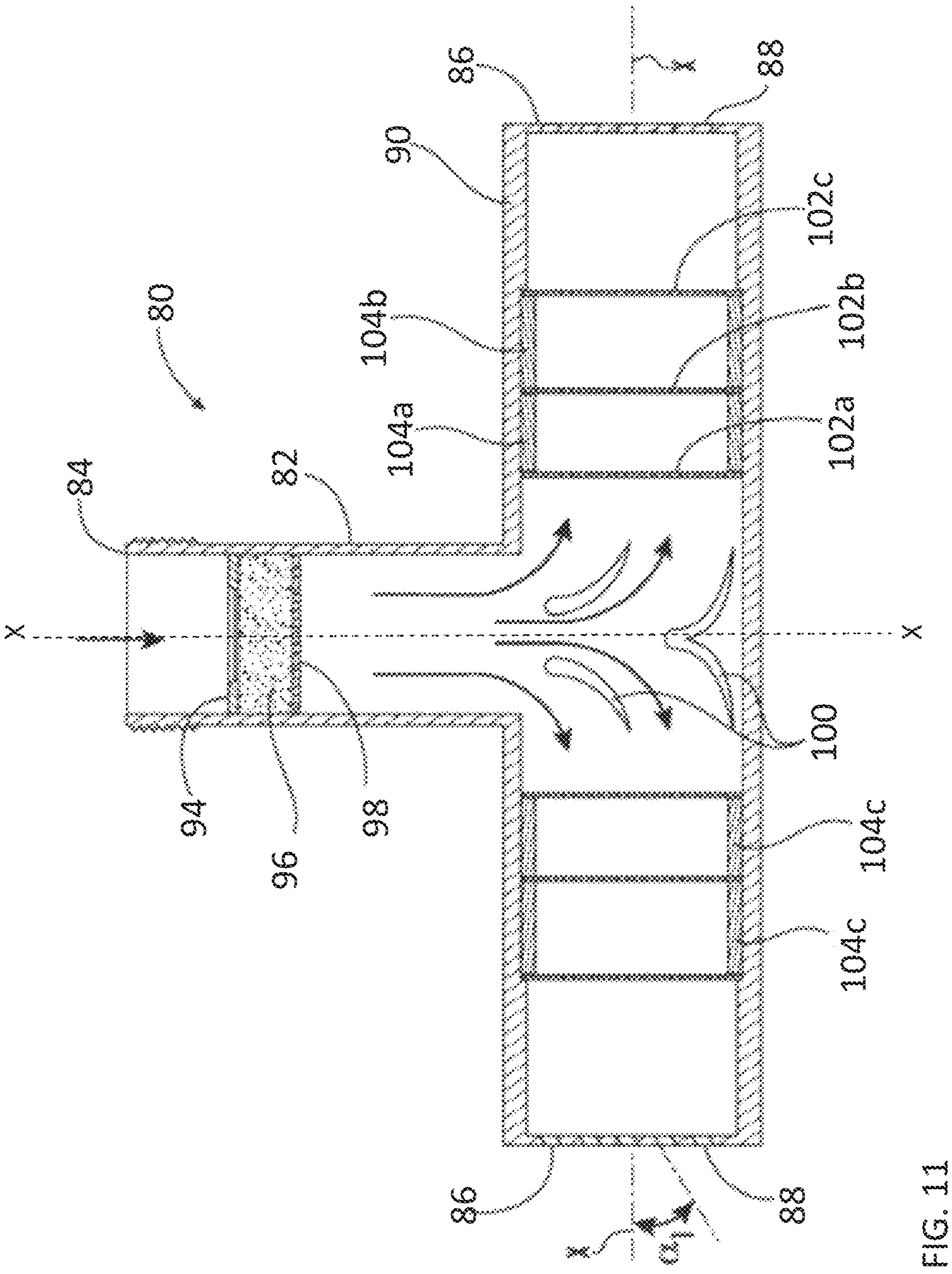
FIG. 11 is a cross-sectional view taken alone line 10-10 of FIG. 10 according to an embodiment.

Referring now to FIGS. 10 and 11, there is illustrated another embodiment of the low velocity noise reduction nozzle of that is designated generally by reference numeral 80. Nozzle assembly 80 is designed for use in a server room 10 of a data center 12 where there are height limitation issues, and it is configured to efficiently vector a flow of fire extinguishing agent in a 360 degree cylindrical pattern.

With continuing reference to FIG. 10, nozzle assembly 80 includes a cylindrical body portion 82 having a threaded inlet end 84 for receiving fire suppressant agent from a fire suppressant system at a particular entrance mass flow and inlet pressure. Nozzle assembly 80 further includes a cylindrical nozzle portion 90 that has an outer peripheral wall 86 having a plurality of exit orifices 88 formed therein, which are oriented at a preferred angle tri relative to an axial plane X-X of nozzle portion 80 for fluid vectoring, as shown in FIG. 10. It is envisioned that the exit orifices 88 in the outer wall 86 could all be oriented at the same angle or a oriented at different angles relative to the axial plane X-X of the nozzle portion 90.

The inlet end 84 of the body portion 82 of nozzle assembly 80 includes a metering orifice 94, a porous metal foam insert 96 downstream from the metering orifice 94, and a perforated filter member 98 of the type shown in FIG. 9, downstream from the porous metal foam insert 96. In combination, these components function to initially reduce the entrance pressure of the fire extinguishing agent.

Referring to FIG. 11, turning vanes 100 are provided within the nozzle portion 90 of nozzle assembly 80 between the inlet end 84 of the body portion 82 and the exit orifices 88 in outer wall 86 to direct the flow of fire suppressant and reduce internal noise caused by turbulence. One or more coaxially arranged perforated filter members are also positioned within the cylindrical nozzle portion 90, downstream from the central turning vanes 100 and upstream from the outer peripheral wall 86 for reducing the entrance pressure of the fire extinguishing agent, in furtherance of noise level reduction. More particularly, as shown in FIG. 11, three coaxially arranged perforated filter members 102*a*-102*c* are positioned within nozzle portion 90, separated by a plurality of annular upper and lower spacer rings 104*a*-104*d*.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A nozzle assembly for a fire suppression system, comprising:

a body having an inlet end for receiving a flow of fire extinguishing agent from the fire suppression system at an inlet pressure;

a nozzle portion extending from the body, the nozzle portion having:

an interior cavity having an outlet end;

a center body arranged within the interior cavity adjacent the outlet end; and a plurality of exit orifices are formed in an outer wall of the nozzle portion, in communication with the interior cavity, for vectoring the flow of fire extinguishing agent exiting therefrom and to reduce a noise level of the nozzle assembly, wherein at least a portion of the plurality of exit orifices are positioned in overlapping arrangement with the center body along a central axis of the nozzle portion and wherein an internal cross-sectional area of the interior cavity taken at any location along the central axis X-X of the nozzle portion is equal to a total open area of the plurality of exit orifices arranged downstream from that location; and at least one perforated filter member positioned upstream from the plurality of exit orifices formed in the nozzle portion, for reducing the inlet pressure of the flow of fire extinguishing agent.

2. The nozzle assembly as recited in claim 1, wherein the nozzle portion is cylindrical in shape.

3. The nozzle assembly as recited in claim 1, wherein a cross-sectional area of the center body varies over a length of the center body, the length being oriented parallel to a longitudinal axis of the nozzle assembly.

4. The nozzle assembly as recited in claim 3, wherein the center body has an upstream end and a downstream end, and a diameter of the center body at the upstream end is smaller than a diameter of the center body at the downstream end such that the center body is generally conical in shape.

5. The nozzle assembly as recited in claim 1, wherein the center body has a hollow interior.

6. The nozzle assembly as recited in claim 5, wherein the hollow interior of the center body is filled with a sound absorbing material.

7. The nozzle assembly as recited in claim 5, wherein one or more apertures are formed in a surface of the center body.

8. The nozzle assembly as recited in claim 7, wherein the center body is formed from a sheet metal.

9. The nozzle assembly as recited in claim 7, wherein the center body is formed from a mesh material.

10. The nozzle assembly as recited in claim 1, wherein the at least one perforated filter member is formed from a perforated metal plate.

11. The nozzle assembly as recited in claim 10, wherein the at least one perforated filter member has about between 20% to 40% open area as defined by a multiplicity of perforations.

12. The nozzle assembly as recited in claim 1, wherein the at least one perforated filter member includes a plurality of perforated filter members positioned within the interior cavity of the nozzle portion in spaced apart relationship along a central axis thereof.

13. The nozzle assembly as recited in claim 12, wherein each of the plurality of perforated filter members has the same porosity.

14. The nozzle assembly as recited in claim 12, wherein each of the plurality of perforated filter members has a different porosity.

15. The nozzle assembly as recited in claim 1, wherein a porous metal foam insert is positioned downstream from the at least one perforated filter member.

16. The nozzle assembly as recited in claim 1, wherein the inlet end of the body includes a metering orifice.

17. The nozzle assembly as recited in claim 1, wherein the flow of fire extinguishing agent is output from the plurality of exit orifices having a horizontal orientation.

* * * * *